United States Patent [19]

MacEwen

BEST AVAILABLE COPY

[11] E Re. 29,074

[45] Reissued Dec. 14, 1976

[54] GABLE TOPPED CONTAINER AND PAPERBOARD BLANK

[75] Inventor: George E. MacEwen, Kansas City, Mo.

[73] Assignee: Phillips Petroleum Company, Bartlesville, Okla.

[22] Filed: Nov. 6, 1975

[21] Appl. No.: 629,251

Related U.S. Patent Documents

Reissue of:

[64] Patent No.: 3,722,780
Issued: Mar. 27, 1973
Appl. No.: 109,177
Filed: Jan. 25, 1971

U.S. Applications:

[63] Continuation-in-part of Ser. No. 51,495, July 1, 1970.

[52] U.S. Cl. ..... 229/17 G
[51] Int. Cl.[2] ..... B65D 5/72
[58] Field of Search ..... 229/17 G, 17 R

[56] References Cited

UNITED STATES PATENTS

| | | | |
|---|---|---|---|
| 3,178,091 | 4/1965 | Tobias et al. | 229/17 G |
| 3,245,603 | 4/1966 | Wilcox | 229/17 G |
| 3,297,227 | 1/1967 | Wallstem | 229/17 G |
| 3,450,328 | 6/1969 | Barrett | 229/17 G |
| 3,471,076 | 10/1969 | Crawford | 229/17 G |
| 3,543,993 | 12/1970 | Rausing | 229/17 G |

*Primary Examiner*—Davis T. Moorhead

[57] ABSTRACT

A gable topped container and a paperboard blank for forming the containers constructed with ridge panels that are a substantially common width and with an end closure member having an interrupted, weakened line of severance at an elevation higher than the lowermost edges of the ridge panels with the uppermost edges of the roof panels and end closure member being at a substantially common elevation. The weakened line of severance is coated with a material being of a type for preventing sealing of the ridge panels to the portion of the end closure member covered by said material coating.

13 Claims, 6 Drawing Figures

Figure 1:
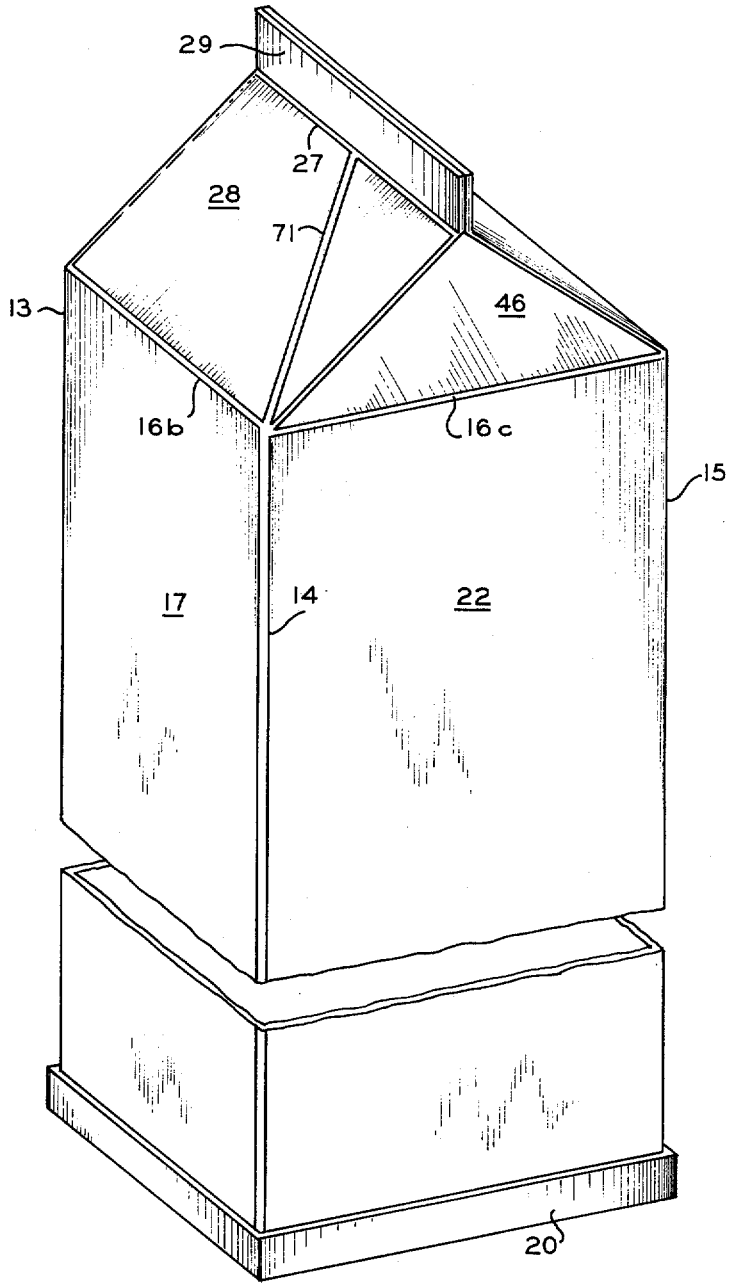

INVENTOR.
G. E. Mac EWEN
BY Young & Quigg
ATTORNEYS

INVENTOR.
G. E. MacEWEN

BY Young & Quigg

ATTORNEYS

INVENTOR.
G. E. MacEWEN

BY Young & Quigg

ATTORNEYS

INVENTOR.
G.E. MacEWEN

BY Young & Quigg

ATTORNEYS

GABLE TOPPED CONTAINER AND PAPERBOARD BLANK

Matter enclosed in heavy brackets[ ]appears in the original patent but forms no part of this reissue specification; matter printed in italics indicates the additions made by reissue.

This application is a continuation-in-part of copending U.S. application Ser. No. 51,495, filed July 1, 1970.

It is desired to have a gable topped container having ridge panels and an end closure member each having an upper edge at a common elevation with a pour spout within one of said elements located at an elevation higher than the lowermost edges of the ridge panels.

This invention therefore resides in a gable topped container and a paperboard blank for forming the container, which container has ridge panels and an end closure member each having an upper edge at a common elevation with an interrupted, weakened line of severance extending traversely within the end closure member at a elevation higher than the lowermost edges of the ridge panels.

Other aspects, objects and advantages of the present invention will become apparent from a study of the disclosure, the appended claims, and the drawing.

Figure 2:
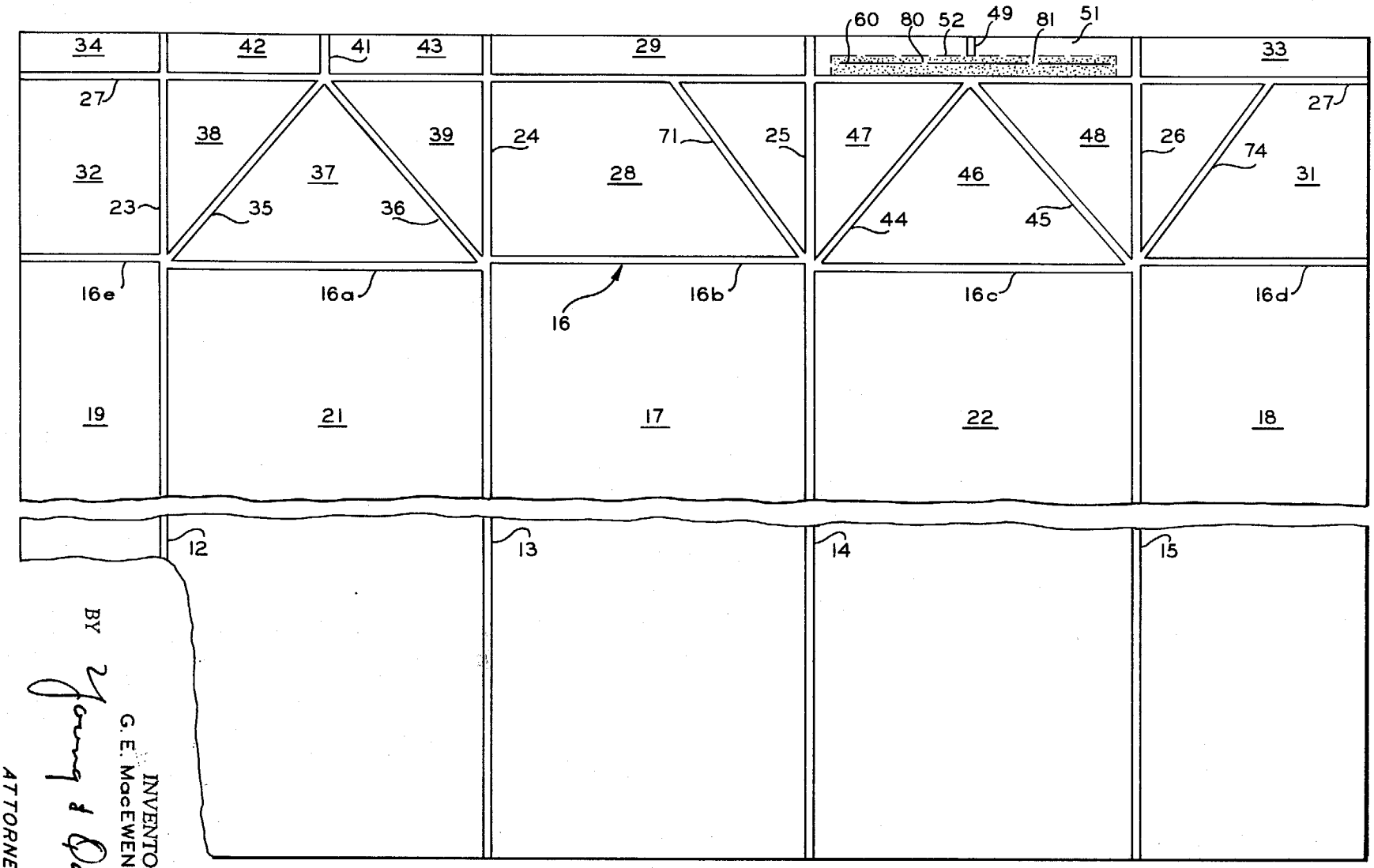
Figure 3:
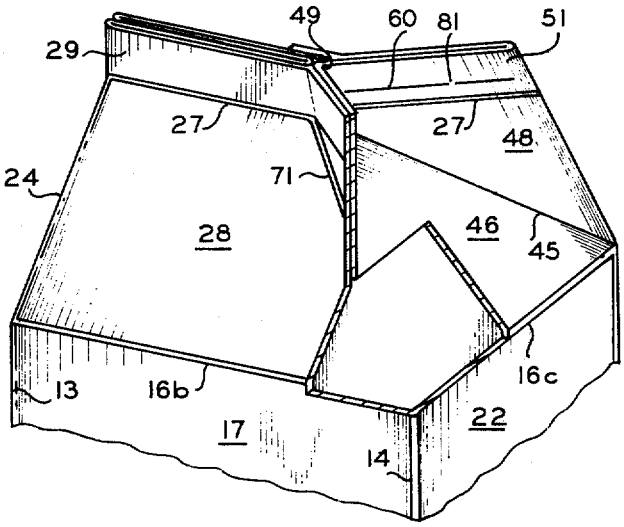
Figure 4:
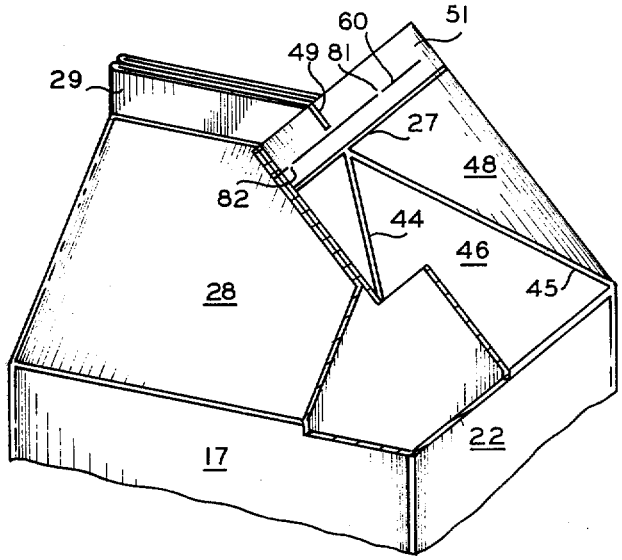
Figure 5:
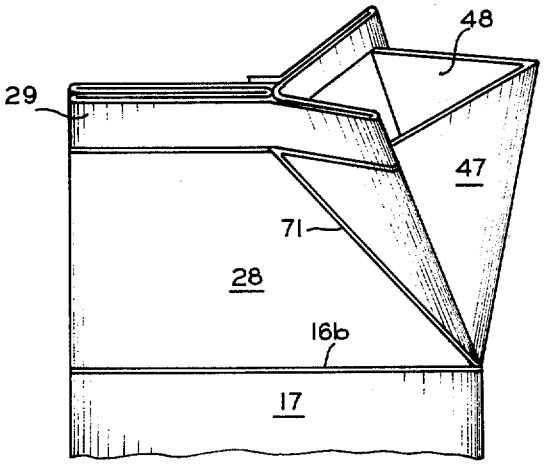
Figure 6:
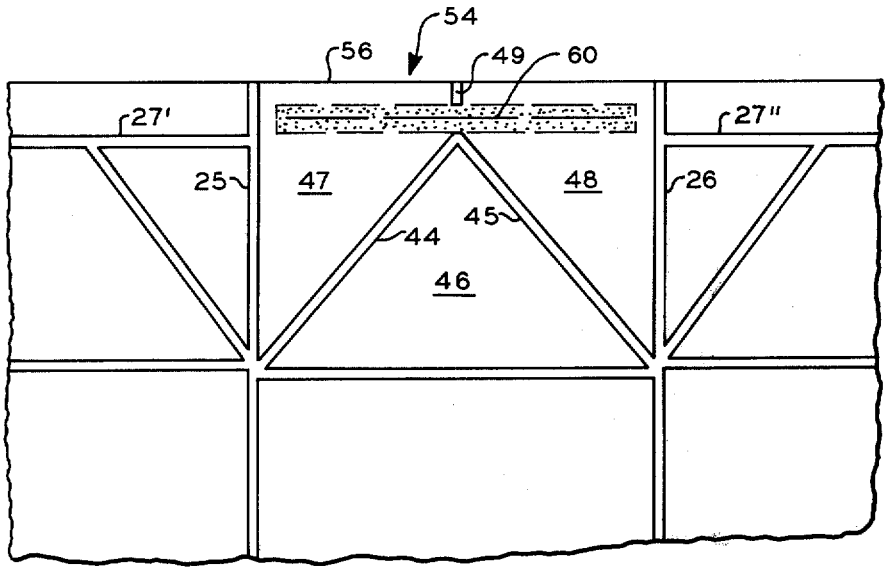

In the drawing,

FIG. 1 is a perspective view of a container embodying the invention,

FIG. 2 is a plan view of one embodiment of the paperboard blank from which the container of this invention is formed, FIG. 3 is a perspective view of the gable topped structure in partial cross section in a partially opened condition, FIG. 4 is a perspective view of the gable topped structure in partial cross section in an advanced open condition, FIG. 5 is a perspective view of the gable topped structure in the fully opened condition, and FIG. 6 is a partial view of another, preferred embodiment of the paperboard blank of this invention.

Referring to FIG. 2, the rectangular blank is provided with vertical score lines 12, 13, 14 and 15, extending upwardly from the lower edge of the blank to a series 16 of first horizontally extending score lines 16a, 16b, 16c, 16d and 16e. The score lines 13, 14 and 16b define a front sidewall panel 17. Score lines 15 and 16d, and 12 and 16e define panels 18 and 19, the free edges of which in the formed container are overlapped and joined by a permanent adhesive bond to form a rear sidewall panel which is located opposite front side panel 17. First 22 and second 21 end wall panels are defined by score lines 14, 15, and 16c and 12, 13, and 16a, respectively. With this scoring arrangement as shown in FIG. 2, the panels 17, 21, 22, and the rear wall panel formed by panels 18 and 19 are all of equal width in the formed condition of the container.

The vertical score lines 12, 13, 14, and 15, which are located at the vertical corners of the completed container as shown in FIG. 1, extend upwardly past score line 16, as at 23, 24, 25, and 26, and terminate at the top edge of the blank. A second horizontal score line 27 is located a short distance downward from the upper edge of the blank and parallel to the upper edge of the blank. When the blank has been folded in tubular form and overlapping edges of the panels 18 and 19 have been joined together, a bottom closure 20 (FIG. 1) is permanently sealed to the lower ends of the tubular formation. Score lines 24, 25, 16b and 27 define the front roof closure panel 28. Score lines 24, 25, and 27 define a ridge panel 29, surmounting the front roof closure panel 28. Score lines 23, 26, 16d, and 16e, and 27 define the rear roof closure panel comprised of sections 31 and 32. Score lines 26, 23, and 27 define the ridge panel, comprising sections 33 and 34, surmounting the rear roof panel. Score lines 25, 26, 16c, and 27 define the first rectangular end closure panel. This first end closure panel is provided with converging score lines 44 and 45, which at their upper ends intersect score line 27 medial of score lines 25 and 26, thus defining a first triangular end closure panel portion 46 and a pair of first fold-back panels 47 and 48. Score lines 23, 24, 16a and 27 define a second rectangular end closure panel. This end closure panel is provided with converging score lines 35 and 36, which at their upper end intersect the second score line 27 medial of score lines 23 and 24, thus defining a second triangular end closure panel portion 37 and a pair of second triangular fold-back panel portions 38 and 39. Score lines 23, 24, 27 and 41 define ridge panels 42 and 43, surmounting second fold-back panel portions 38 and 39, respectively. Score lines 25, 26 and 27 define ridge panel 51 surmounting the first fold-back panels 47 and 48. In the completed container, the pair of opposed roof panels 28 and 31, 32, are inclined toward each other and overlie the top of the tubular body formed by sidewalls 17, 21, 22 and 18, 19. The pair of second opposed triangular end closure panels 37 and 46 are enfolded between roof panels 28 and 31, 32, from the opposite gable ends formed by the latter, and with their apexes located at the central area of the gable.

The fold lines 44, 45, and 35, 36 which join each pair of first and second triangular fold-back panels 47, 48 and 38, 39 to opposite sides of the first and second triangular end closure panels 46 and 37 are in proximity with the roof panels, the fold-back panels being folded against the underside of the roof panels. Ridge panel 51 surmounting the first fold-back panels 47 and 48 is hinged together at the apex of the first end closure panel 46 and is folded as shown in FIG. 1 about the hinge joinder score line 49 in face-to-face relation, between the ridge panels 29 and 33 surmounting the roof panels. Similarly, ridge panels 42 and 43 surmounting fold-back panels 38 and 39 are hinged together at the apex of the second end closure panel 37 and are folded about the hinged joinder score line 41 in face-to-face relation, between ridge panels 29 and 34. The ridge panels 29, 33, 34, 42, 43 are of a common width and common elevation and are sealed to one another.

FIG. 6 shows another embodiment of the blank of this invention for forming the container of this invention. In this preferred embodiment, a portion of the second score line 27 is interrupted between vertical score lines 14 and 15 thereby forming second score line portions 27' and 27'' on the blank and an end closure member 54 defined by an upper edge 56 of the blank and score lines 25, 44, 45, and 26.

Referring to FIG. 2, at least one of the ridge panels, 51 for example, of its associated fold-back panels 47, 48 has an interrupted weakened line of severance 60 extending solely within and along its ridge panels. A portion 52 of the ridge panel 51 about and immediately adjacent the line of serverance 60 is not sealed to another ridge panel. This unsealed portion 52 of the ridge panel 51 preferably extends at least to the edge of the ridge panel below the line of severance 60 over the length of the weakened line of severance 60 for assuring easily breaking and opening of the pour spout formed by this line of severance 60 and adjacent structure. More preferably, the coating material extends at least 5/16 inch below the line of severance over the length of the weakened line of severance.

In the embodiment shown in FIG. 3, the interrupted, weakened line of severance 60 extends traversely across an upper portion of the end closure member 54 to an elevation higher than the lowermost edges of the ridge panels defined by score lines 27', 27''. The upper edge of said end closure member is at a common elevation with the upper edges of the ridge panels 29, 33, 34, 42, 43 thereby forming a blank having a linear upper edge 56 as the blank of FIG. 2.

The other aspects of the blank shown in FIG. 6 and the container formed therefrom are as described with reference to the blank of FIG. 2. The omission of the portion of score line 27 provides increased snap-open characteristics as hereafter described and further prevents damage to the coating material applied to portion 52 during scoring of the blank, for example.

The coating material, for example, one selected from the group comprising heat resistant latex water varnish type, catalyzed epoxy type, fluoro-carbon type, and various nitrocellulose type material formulated from a base nitrocellulose resin and a modifying resin, for example, is coated on an inner side of the unsealed portion 52 of the carton to prevent adherence of that portion 52 to other portions of the carton.

The weakened line of severance 60 comprises a straight line cut that extends completely through the ridge panel 51 with said cut line being interrupted by at least two spaced-apart uncut portions 80 and 81. These uncut portions preferably each have a length at least as great as the thickness of the container blank in order to assure that said line of severance 60 does not sever prematurely during forming of the container. The uncut portions are preferably not greater than three times the thickness of the container blank or the container. A length of from 1 to 2 times the container thickness is preferred. In order to prevent leakage of material through this severance line 60, it is preferred that the severance line 60 terminate at locations spaced from the side edges of the ridge panel 51 or the end closure member 54 upon which the line of severance 60 is formed. The ridge panels of FIG. 2 and the ridge panels and a portion of the end closure member of FIG. 6 preferably have a polyethylene coating for heat sealing of the panels one to the other.

In order to provide a snap-action for opening and closing the pouring spout, the front roof panel 28 is provided with score line 71 extending upwardly from the intersection of the horizontal score line 16b and vertical score line 25 to a point on score line 27 midway between vertical score lines 24 and 25. The rear roof panel portion 31 is also provided with score line 74 corresponding to score line 71.

The container, FIG. 1, formed from the blank of either FIG. 2 or FIG. 6, can be opened by applying outward pressure against the fold-back panels 47 and 48 to cause a separation of the bond between the adjacent outer faces of ridge panel 51. The container at this stage is illustrated in FIG. 3. Roof panels 28 and 31, 32 have broken along score lines 71 and 74, respectively. Pressure can then be applied against the end closure member 54 or panels 47, 51, and 48, 52 as applicable to move these panels toward the container as shown in FIG. 4. Further pressure can then be applied to sever triangular end closure panels 47 and 48 or end closure member 54 along the weakened line of severance 60 from ridge panels 29 and 33 and cause triangular panels 46, 47 and 48 or panel 46 and end closure member 54 to snap partially open. FIG. 5 illustrates a container in the stable opened position. The container can be closed by applying a pressure against panel 46 to move it inwardly at a point during such inward movement, panel 46 will experience a snap-action and be returned to its stable closed position, similar to position illustrated in FIG. 3.

Other modifications and alterations of this invention will become apparent to those skilled in the art from the foregoing discussion and accompanying drawings, and it should be understood that this invention is not to be unduly limited thereto.

What is claimed is:

1. In a gable topped container of sheet material comprising a tubular body having four sidewalls, a bottom closure, a pair of opposed roof panels inclining toward each other and overlaying the top of said body, first and second triangular end closure panels being enfolded between said roof panels from the opposite gable ends formed by the latter, a pair of triangular fold-back panels each joined to opposed sides of the [second] *first* triangular end closure panel along fold lines which are in proximity with said roof panels, said fold-back panels being folded against the underside of said roof panels, a separate ridge panel surmounting each of said roof panels and said [second] pair of triangular fold-back panels, [each] *the* pair of ridge panels surmounting the [second] pair of triangular fold-back panels being hinged together at the apex of the contiguous *first triangular* end closure panel and being folded about such hinged joinder in face-to-face relationship between the ridge panels surmounting said roof panels, the [first] *second* triangular end closure panel having an end closure member joined to the roof panels, the ridge panels of the roof panels, and to opposed sides of the [first] *second* triangular end closure panel along fold lines which are in proximity with said roof panels, *the lower portion of* said end closure member being folded against the underside of said roof panels *and the upper portion of said end closure being folded* in face-to-face relationship [with] *between* the ridge panels surmounting said roof panels, the improvement comprising:

the end closure member having an interrupted, weakened line of severance extending transversely across [an] *said* upper portion of said end closure member at an elevation higher than the lowermost edges of the ridge panels with an upper edge of said end closure member being at substantially a common elevation with the uppermost edges of the ridge panels and being sealed to the adjacent ridge panels [of] *surmounting* the roof panels, and a coating material covering the end closure member at a location about and immediately adjacent the line of severance, said coating material being of a type for preventing sealing of the ridge panels to the portion of the end closure member covered by said [material] coating *material*, said coating material extending at least 5/16 inch below the line of severance over the length of the weakened line of severance.

2. A gable topped container, as set forth in claim 1, wherein the ridge panels and end closure member have a polyethylene coating and are heat sealed one to the other.

3. A gable topped container, as set forth in claim 1, wherein the weakened line of severance comprises a straight cut line extending completely through the end closure member with said cut line being interrupted by at least two spaced-apart uncut portions.

4. A gable topped container, as set forth in claim 3, wherein the interrupted portions of the cut line each have a length of not greater than about three times the thickness of the container blank.

5. A gable topped container, as set forth in claim 1, wherein the interrupted, weakened line of severance terminates at locations spaced from the side edges of the end closure member upon which the line of severance is formed.

6. A gable topped container, as set forth in claim 1, wherein a score line extends traversely across the end closure member defining a ridge panel thereon that is of substantially equal width relative to the ridge panels of the associated roof panels for dividing the end closure member into a ridge panel and a pair of triangular fold-back panels.

7. In a paperboard blank for forming a container of rectangular formation having a gable top, said blank being formed with laterally spaced-apart score lines extending vertically from the lower to the upper edge of the blank, a first score line extending transversely of the blank in downward-spaced relationship to the upper edge thereof, said first score line in conjunction with said vertically extending score lines, defining opposed front and rear sidewall panels and opposed first and second end wall panels, a second interrupted transversely extending score line arranged at a substantially common elevation intermediate the upper edge of said blank and said first transversely extending score line and defining, in conjunction therewith and with said vertically extending score lines, a [first] *front* roof closure panel surmounting said front sidewall panel, a rear roof closure panel surmounting said rear sidewall panel, and an area surmounting said second end wall panel, said area being provided with converging score lines inclining upwardly from said first transverse score line to its respective second transverse score line defining a *first* triangular end closure panel and a [second] pair of triangular fold-back panels hinged to the *first* triangular end closure panel, converging score lines inclining upwardly from said first transverse score line adjacent the first end wall panel to the elevation of the second score line and defining a [first] *second* triangular end closure panel and an end closure member, the improvement comprising:

ridge panels each having substantially a common width surmounting said roof panels and said area, said end closure member and said ridge panels having upper edges at a substantially common elevation, said ridge panels being defined by the second transversely extending score line being substantially parallel to the upper edge of the blank and in conjunction with said vertically extending score lines and said end closure member being defined by the first score line in conjunction with said vertically extending score lines;

an interrupted, weakened line of severance extending transversely across an upper portion of said end closure member at an elevation higher than the second score line; and a coating material covering the end closure member at a location about and immediately adjacent the line of severance, said coating material being of a type for preventing sealing of the ridge panels to the portion of the end closure member covered by said [material] coating *material*, said coating material extending at least 5/16 inch below the line of severance over the length of the weakened line of severance.

8. A paperboard blank, as set forth in claim 7, wherein the ridge panels and the end closure member have a polyethylene coating and are heat sealable one to the other.

9. A paperboard blank, as set forth in claim 7, wherein the material about and immediately adjacent the line of severance extends at least to an elevation of the second score line over the length of said weakened line of severance.

10. A paperboard blank, as set forth in claim 7, wherein the weakened line of severance comprises a straight cut line extending completely through the paper board with said cut line being interrupted by at least two spaced-apart uncut portions.

11. A paperboard blank, as set forth in claim 10, wherein the interrupted portions of the second cut line have a length not greater than about three times the thickness of the paperboard blank.

12. A paperboard blank, as set forth in claim 7, wherein the interrupted, weakened line of severance terminates at locations spaced from the adjacent ridge panels.

13. A paperboard blank, as set forth in claim 7, wherein the second score line is continuous, traverses the entire blank and thereby divides the end closure member into a pair of fold-back panels and a ridge panel.

* * * * *